(12) United States Patent
Royse et al.

(10) Patent No.: US 8,640,522 B2
(45) Date of Patent: Feb. 4, 2014

(54) SYSTEMS AND METHODS FOR REMOTE TESTING OF A FLOW SWITCH

(75) Inventors: David L. Royse, Wildwood, MO (US); Richard L. Ulrich, Manchester, MO (US); Donald Bruce LaRue, Manchester, MO (US)

(73) Assignee: Potter Electric Signal Company, LLC, Hazelwood, MO (US)

( * ) Notice: Subject to any disclaimer, the term of this patent is extended or adjusted under 35 U.S.C. 154(b) by 439 days.

(21) Appl. No.: 13/110,802

(22) Filed: May 18, 2011

(65) Prior Publication Data

US 2012/0291518 A1    Nov. 22, 2012

(51) Int. Cl.
*G01P 21/00* (2006.01)

(52) U.S. Cl.
USPC ............................................. 73/1.16

(58) Field of Classification Search
USPC ................................. 73/1.16, 1.42
See application file for complete search history.

(56) References Cited

U.S. PATENT DOCUMENTS

| | | | |
|---|---|---|---|
| 4,782,333 A * | 11/1988 | Merchant | 340/610 |
| 5,236,049 A | 8/1993 | Asselin et al. | 169/61 |
| 5,320,138 A | 6/1994 | Ferlitch, Jr. | 137/552.7 |
| 6,314,792 B1 | 11/2001 | Cain | 73/37 |
| 6,331,820 B1 | 12/2001 | Borbath et al. | |
| 6,462,655 B1 | 10/2002 | Ha | 340/514 |
| 6,810,910 B2 | 11/2004 | McHugh | 137/601.16 |
| 2002/0092745 A1 | 7/2002 | Shafique et al. | 200/81 R |
| 2009/0188683 A1 | 7/2009 | McHugh | 169/60 |

OTHER PUBLICATIONS

International Search Report, International Patent Application No. PCT/US2012/037736, mailed on Dec. 27, 2012, 8 pages.

* cited by examiner

*Primary Examiner* — Peter Macchiarolo
*Assistant Examiner* — Tamiko Bellamy
(74) *Attorney, Agent, or Firm* — Lewis, Rice & Fingersh, L.C.

(57) ABSTRACT

Systems and methods for the remote testing of a paddle-type flow detector, such as are common in fire protection systems. Specifically, the systems and methods provide for mechanical movement of the vane to test activation of the flow detector under a flow condition, and which measure the amount of time the vane takes to return to the ready position to verify the presence of a paddle on the vane.

20 Claims, 8 Drawing Sheets

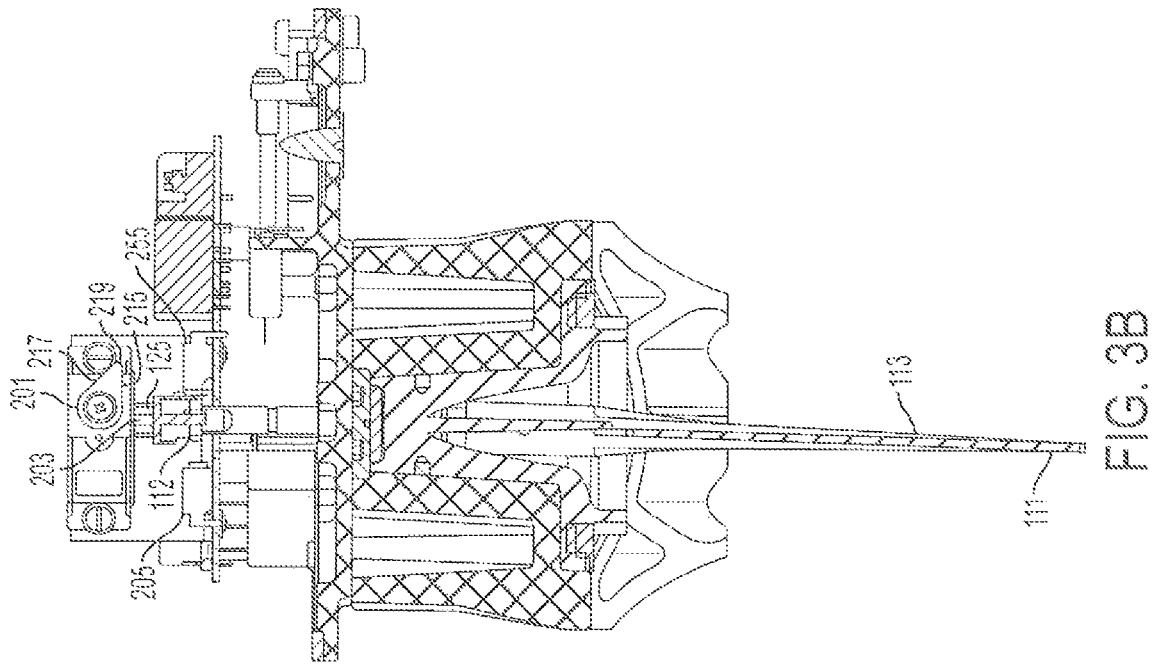
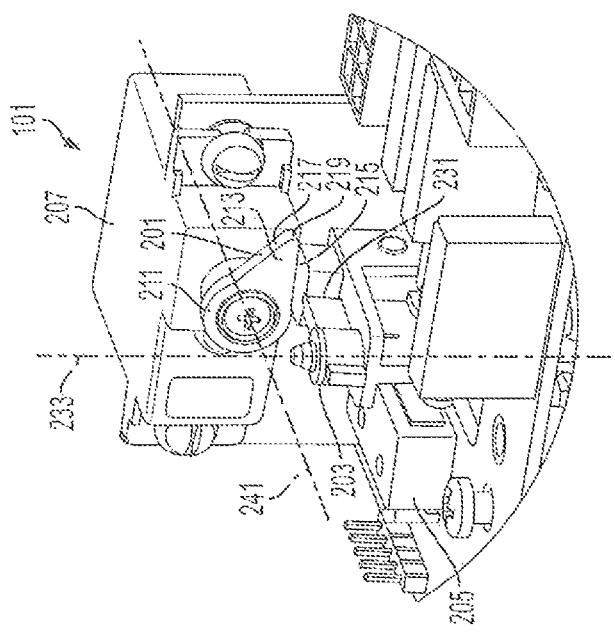

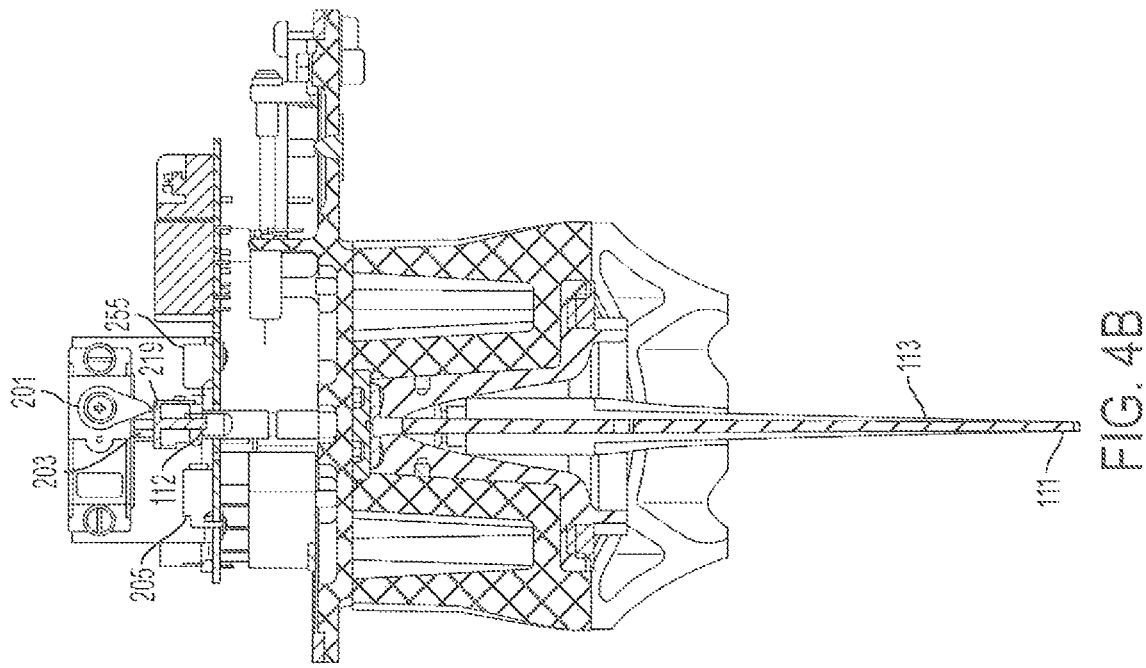
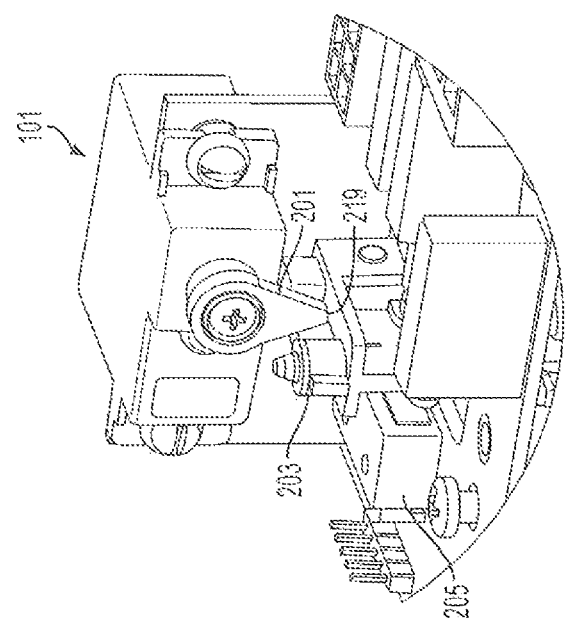

SYSTEMS AND METHODS FOR REMOTE TESTING OF A FLOW SWITCH

BACKGROUND

1. Field of the Invention

The present invention generally relates to switches and switch testing apparatus. Specifically it relates to switches that are triggered by fluid flow and remote testing thereof.

2. Description of the Related Art

To fight fires in modern buildings, firefighters use a wide variety of tools but are also regularly aided by systems within the building. Modern buildings almost universally include water-based fire protection systems to control or extinguish fires. Fire sprinkler systems generally follow a fairly standardized principle. A liquid firefighting material (generally water) is maintained in a series of pipes, generally under pressure, which are arranged throughout all areas of the building.

In a wet pipe system, water is actually stored within the pipes, whereas in a dry pipe system, water is stored external to the building while the pipes contained pressurized air, nitrogen, or other gas. Attached to these pipes are various sprinklers which, when activated, will spray the liquid into a predetermined area. When a fire situation is detected, sprinklers on the pipe structure are activated by heat. This opens them and allows them to spray water from the pipe system.

The heat activation is generally performed by a heat sensitive element, an integral part of the sprinkler, which is activated by the heat from the fire. Specifically, the sprinkler utilizes a "plug" holding it closed. The plug is damaged by heat which results in the pressurized water inside the pipes being pulled to and through the opening in the now activated sprinkler head. Generally, each sprinkler has its own heat sensitive element and is activated independent of all other sprinklers. This action dispenses the liquid on the fire and serves to control or extinguish the fire.

This system can be very effective because there is no reliance on notification systems or other separate components where a communication breakdown could occur. There is always concern in a fire protection system, that the fire could damage any form of notification system prior to it being able to provide notice. In the plug arrangement discussed above, there is very little possibility of the sprinkler system failing to activate due to damage from the fire. As the damage causes the activation, the system simply enters into a spray mode at that sprinkler. Further, the sprinkler will generally spray until the system is shut off as the water source is often municipal water lines providing a steady feed and there is no switch which can serve to replug the sprinkler once activated. Instead, the unit must be replaced.

Because of the fact that most fire protection systems utilize these type of heat activated sprinklers, they generally do not use smoke detectors or other forms of fire detection apparatus to activate the system. While this works from a fire fighting perspective, in a large building it is often necessary to notify both occupants of the building that the system has activated, and to notify the fire department that the system has activated so that they can come and fight the fire. Therefore, systems beyond those simply to activate the fire sprinkler are desirable as part of the system.

While some sprinkler systems utilize smoke detectors and other detection mechanisms to provide notification, others do not. Further, even if they include detection apparatus, it can be desirable to know if only smoke has been detected and/or if a sprinkler head has activated. Further, detection and notification systems can be damaged by the very fire that the sprinkler has reacted to prior to providing notification. Therefore, most sprinkler systems utilize a system to detect that a sprinkler head has activated as an alternative notification system.

While these detection systems can be simple or complex, most rely upon fluid flow within the pipes of the sprinkler system to detect that a sprinkler head has activated. In particular, when a sprinkler head (or multiple heads) activate, fluid in the pipes will go from a static condition, to a condition where the fluid is moving toward the activated head. This fluidic movement can be detected through the use of a flow detector which is placed in the fluid stream and when the flow detector detects fluid motion ("flow"), an alarm condition is activated to provide notification that water is being dispensed by the system.

Because fluid flow specifically indicates a sprinkler head activation, or a system failure resulting in water dispensing which is another potential emergency, the flow detector is an excellent form of notification of potential danger. Based on the output of a flow detector along with output of other detectors, information can also be gathered as to the potential location of a fire, or if there may be a damaged pipe which is generating flow in a non-fire situation. In a large office building, the ability to send emergency personnel to the correct location quickly can often decrease property damage and potentially save lives.

Flow detectors are more commonly used in wet-pipe systems and most are of relatively straight forward design. They generally comprise an elongated vane including a paddle which extends generally perpendicularly into a pipe in the system, often a large main pipe or riser so that movement of the fluid is detected wherever in the system it occurs. However, flow detectors may be placed on particular pipe components to assist in localizing the position of the flow. The water flow through the pipe forces the paddle forward, which then causes a trip switch at the other end to trip an internal switch activating the alarm condition.

The most common liquid used in fire protection systems is water because it is readily available, non-toxic, and quite effective in firefighting. Water, however, is an electrolyte which can enable electrochemical corrosion to occur where metal and oxygen are also present. Further, the water used in sprinkler systems is generally not pure and can contain a multitude of dissolved solids, water treatment chemicals, and microorganisms. These impurities can contribute to corrosion, including microbiologically induced corrosion, damaging pipes or other components that make up the water-based fire protection system when the system is prepared and "armed" awaiting a possible fire situation. The presence of trapped air (particularly the oxygen in the air) and how active a system is (how often it is drained and filled) will also contribute significantly to corrosion and its damaging effects in water-based fire protection systems.

The degradation of components such as flow detectors is an unavoidable consequence of the inclusion of water in the system. The presence of water within the piping can result in the failure of mechanical components to perform as intended when needed due to components becoming corroded while they are held in their "ready" state. Flow detectors and other types of mechanisms in a fire protection system are particularly susceptible to failure because they often sit for long periods of time in a ready state (switched off) and need to quickly adjust to a new state (switched on) upon the fire system activating. Because of the risk of failure of components such as flow detectors, it is generally desired to periodically test them to insure that they function.

While flow switches can be tested by flowing water through an inspection port (which creates flow through the system simulating an activated sprinkler), this system can be cumbersome. Therefore, it is often desirable to test flow switches remotely without need of flowing water through the entire fire sprinkler system. One system to test flow switches is described in U.S. Pat. No. 6,462,655. This system, while effective, is very complex in that it requires a localized fluid "loop" which is generated to create a limited area of fluid flow about the flow switch within the otherwise static pipe system. While it is effective at performing a flow test, and effectively tests that the flow switch will operate under an actual flow condition, the system is complex to construct, includes additional components vulnerable to corrosion, and is relatively expensive.

SUMMARY

Described herein, among other things, are systems and methods for the remote testing of flow detectors in a fire sprinkler system. Specifically, they are directed to systems and method for the remote testing of flow detectors.

Generally these systems and methods test a number of aspects of the flow detectors during the course of a test run. In particular, there are generally three things that are tested for during the test run. First, the system tests that the flow detector is moveable in the forward direction (the direction of flow during a fire) and that movement of the vane to the desired trip position does, in fact, trip the alarm. The second test is that the vane, once the alarm has tripped, returns back to its default "ready" position so that the test does not disable the flow detector. The third test is to validate that paddle is present and will serve to move the vane when presented with a flow.

For at least the above reasons, described herein, among other things, are systems and methods for the remote testing of a paddle-type flow detector, such as are common in fire protection systems. Specifically, the systems and methods provide for mechanical movement of the vane assembly and specifically the trip stem to test activation of the flow detector under a flow condition, and which measure the amount of time the vane assembly takes to return to the ready position to verify the presence of a paddle.

There are described herein, among other things, a self-test system for a paddle-type flow detector, the system comprising: an arm, the arm being used to displace a trip stem from a first position to a second position wherein said trip stem is biased to said first position and said flow detector indicates flow when said trip stem is in said second position; a first sensor, the first sensor detecting when said trip stem is in said first position; a second sensor, the second sensor detecting when said trip stem is in said second position; wherein, when said trip stem is in said second position, said arm releases said trip stem and said trip stem returns to said first position because of said biasing; wherein, said self-test system determines the amount of time between when said first sensor stops detecting said trip stem and said second sensor detects said trip stem after said arm releases said trip stem; and wherein based on said amount of time, said self-test system determines if a paddle is present on said trip stem.

In an embodiment of the system said arm rotates about an axis and may be sized and shaped to release said trip stem suddenly. In an embodiment, it may be generally teardrop-shaped.

In an embodiment, the arm rotates about said axis a first direction when said arm is displacing said trip stem and a second direction after it has released said trip stem. The system may further comprise a one-way gate, said one-way gate being attached to said trip stem such that said one-way gate is rigid when said arm moving in said first direction contacts said one-way gate, but opens when said one-way gate is contacted by said arm moving in said second direction.

In another embodiment of the system it may comprise a one-way gate attached to said trip stem.

There is also described herein the system wherein said first sensor and said second sensor each comprise switches; wherein said first switch is closed when said trip stem is in said first position; and wherein said second switch is closed when said trip stem is in said second position.

There is also described herein a paddle-type flow detector including an auto-test system, the detector comprising: a housing; a vane assembly extending from said housing; a biasing mechanism biasing said vane assembly to a first position; a first sensor which detects when said vane assembly is in said first position; a second sensor which detects when said vane assembly is in a second position; an arm within said housing, said arm displacing said vane assembly from a first position to a second position when an auto-test is initiated; wherein, when said vane assembly is in said second position, said arm releases said vane assembly and said vane assembly returns to said first position because of said biasing; wherein, said detector determines the amount of time between when said first sensor stops detecting said vane assembly and said second sensor detects said vane assembly after said arm releases said vane assembly; and wherein based on said amount of time, said detector determines if a paddle is present on said vane assembly.

In an embodiment of the detector the paddle-type flow detector is position in a fire sprinkler system which may be a wet pipe system.

In an embodiment of the system said arm rotates about an axis and may be sized and shaped to release said vane assembly suddenly. In an embodiment, the vane assembly comprises a trip stem which may have a one way gate attached thereto.

In an embodiment, the arm rotates about said axis a first direction when said arm is displacing said vane assembly and a second direction after it has released said vane assembly. The system may further comprise a one-way gate, said one-way gate being attached to said vane assembly such that said one-way gate is rigid when said arm moving in said first direction contacts said one-way gate, but opens when said one-way gate is contacted by said arm moving in said second direction.

There is also described herein the system wherein said first sensor and said second sensor each comprise switches; wherein said first switch is closed when said vane assembly is in said first position; and wherein said second switch is closed when said vane assembly is in said second position.

In an embodiment the detector, comprises a key box, said key box allowing a user to initiate the self-test which may include an indicator indicating the result of said self-test.

BRIEF DESCRIPTION OF THE DRAWINGS

For a better understanding of the embodiments described herein and to show more clearly how they may be carried into effect, reference will now be made, by way of example only, to the accompanying drawings which show at least one example embodiment.

FIGS. 3A and 3B show a partial perspective and cut-away side view respectively of an embodiment of a flow detector in a pre-test or "ready" state.

FIGS. 4A and 4B show a partial perspective and cut-away side view respectively of an embodiment of a flow detector as the testing arm contacts the one-way gate.

DESCRIPTION OF THE PREFERRED EMBODIMENT(S)

This disclosure provides systems and methods for the testing of flow detectors in situ in a fire protection sprinkler system. It should be recognized, however, that the test systems and methods discussed herein can be used with flow detectors in other applications and not those used just in fire protection. Further, the systems and methods can be used to test other "motion" switches which rely upon a lever arm (such as a trip stem and paddle) to detect motion.

Figure 1:
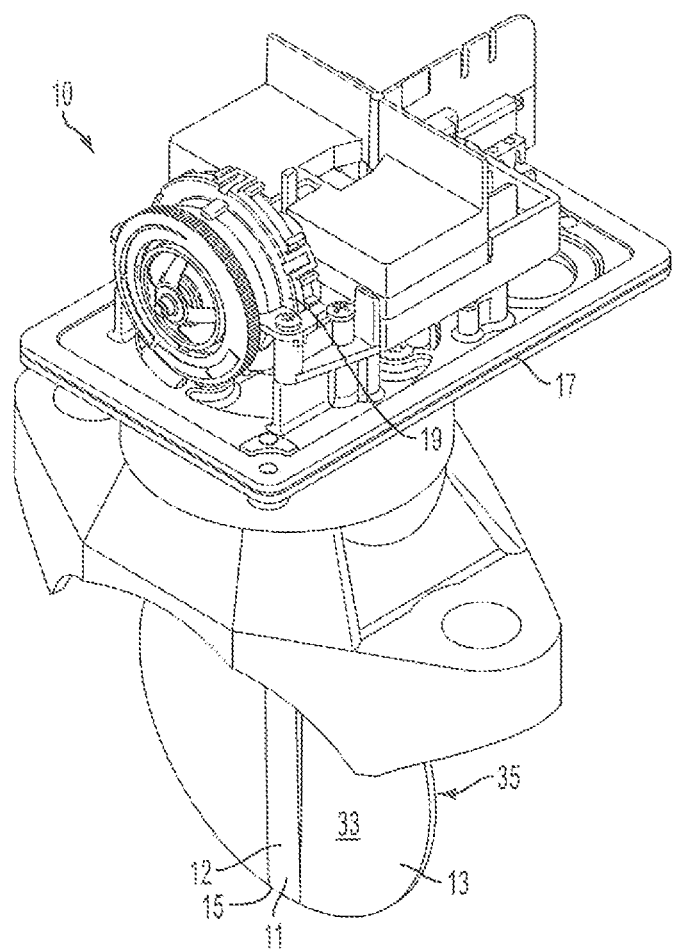
FIG. 1 is a perspective view of a flow detector of the prior art with the housing removed to show internal components.

FIG. 1 provides for a general overview of a vane type flow detector (10) of the type known to those in the art. The flow detector (10) generally includes a couple of major components. Specifically, it includes the vane assembly (11) which comprises a trip stem (12) and an expanded paddle (13) arranged toward its distal end (15). Toward the proximal end, the trip stem (12) is generally connected to a housing (17) about an axis of rotation. This axis allows the vane assembly (11) to rotate through a 2 dimensional arc generally perpendicular to the faces (33) and (35) of the paddle (13). The arc is generally constrained by the housing (17) so that the vane assembly (11) cannot rotate a full 360 degrees, but instead will rotate through a predefined arc.

In an embodiment, the arc is selected so that the vane assembly (11) can only move one direction from the vertical position and the vane assembly (11) may included a biasing mechanism to insure that the natural resting state is vertical. It should be recognized that "vertical," as used herein, does not require that the vane assembly (11) be perpendicular to the ground when installed (it may in fact be horizontal). Instead, it is generally used to refer to the fact that the vane assembly (11) is perpendicular to the housing (17), which will then generally make it perpendicular to the length of the pipe into which it is placed, and thus perpendicular to the fluid flow. Throughout this disclosure, the term "vertical" will be used to refer to this perpendicularity relative to the housing, pipe, and/or fluid flow rather than any specific relation to the earth's surface and is also used to refer to its "ready" state when the vane assembly (11) is generally within activation.

When the vane assembly (11) moves through the allowed arc, at the terminal position it will generally close a switch which is part of a switch and retard assembly (19). The switch may be any type of switch but generally standard electromechanical switches will be used whereby the trip stem (12), when at the terminal point of the arc, serves to close a connection. This closure can then be detected by electrical components (such as a processor) in the detector (10) to serve as the alarm trigger. The retard component will generally implement a retard time delay so that closing of the switch does not immediately trigger an alarm. Generally, the vane assembly (11) will include some form of biasing member (such as a spring) to return it to the vertical position absent the imposition of any internal force so that when the flow detector (10) is positioned in a static fluid, or in a relatively slow flowing fluid, the vane assembly (11) does close the switch. Instead flow of a sufficient force must be present in the system. The retard time delay further reduces false positives by requiring a consistent signal for some time prior to alarm activation. This helps to reduce false positive activations of the detectors (10).

In operation, the flow detector (10) will be placed into the pipe with the paddle (13) extending into the fluid and the faces (33) and (35) directed across the intended flow. Should fluid begin to flow through the pipe, the force of movement will serve to push on the upstream face (33) of the paddle pushing the vane assembly (11) downstream. Because the rotation point of the vane assembly (11) is generally toward the proximal end, the force on the paddle (13) will allow the vane assembly (11) to act as a lever arm and will cause rotation of the vane assembly (11). As should be apparent, due to the length of the trip stem (12) and the surface area of the face of the paddle (13), the flow can cause the vane assembly (11) to rapidly tilt through the available arc. Due to the biasing, a very small flow will generally not serve to move the vane assembly (11) far enough forward to trigger the switch (19), but a faster flow will cause the vane assembly (11) to trigger the switch (19). It should be recognized that switch (19) is generally located upstream of the vertical position of the vane assembly (11) because of the vane's (11) rotation about the axis. Further, a sufficient flow should keep the switch (14) closed so long as the flow continues at or above a predetermined level indicative of a sprinkler head being activated.

Figure 2:
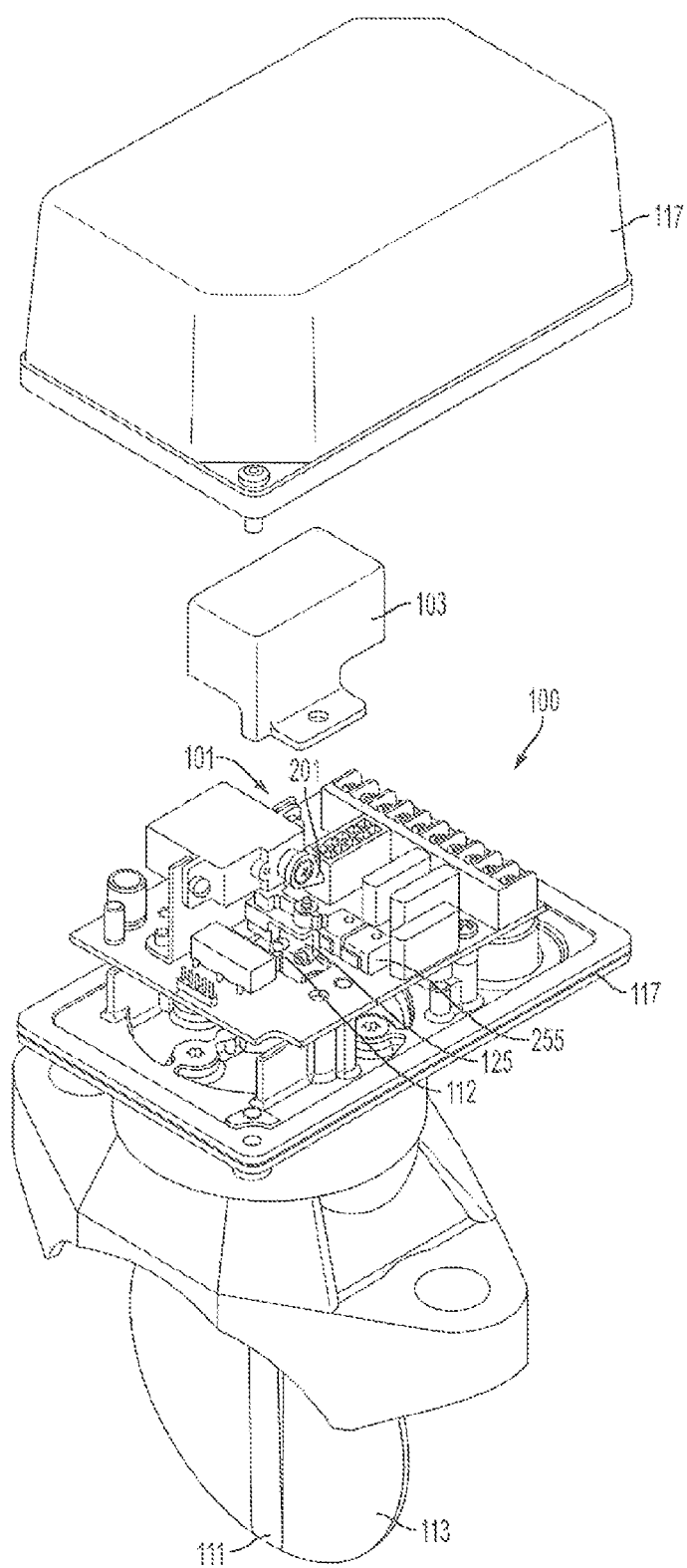
FIG. 2 is a perspective view of an embodiment of a flow detector including a self-test system with the housing partially removed.

FIG. 2 shows a general perspective view of an embodiment of a flow detector (100) which includes a self-test system. In order to protect the self-test system (101), and inhibit dust or other materials from getting in the self-test (101) system, the self-test system (101) will generally be contained within the flow detector's (100) protective housing (117). In the depicted embodiment, the self-test system (101) is also maintained within a secondary housing (103) to separate it from other components that could interfere with its operation and further protect it.

In order to test the flow detector (100), the self-test system (101) comprises a testing arm (201) which serves to push the trip stem (112) to the activated position. In the activated position a sensor (switch (205) in the depicted embodiment) detects the trip stem (112) and triggers the alarm condition. The arm (201) is then designed to release the trip stem (112) to test that the vane assembly (111) returns to the ready "vertical" state under the biasing. After this, the arm (201) returns to the pre-test position resetting the self-test system (101) and placing the detector (100) again in the ready state.

As part of the testing, the proximal end (125) of the trip stem (112), in the depicted embodiment, includes a one way gate (203). The gate (203) allows for the arm (201) to reverse direction and return to the ready state with out pushing the vane assembly (111) in a direction opposing the expected flow. While in an alternative embodiment this is not necessary and the arm (201) can simply continue rotating in the same direction to return to the ready state, the reversing methodology is preferred to save space and to better detect the position of the arm (201).

The structure in the depicted embodiment is best understood based on its operation and is shown in various positions in FIGS. 3-7. FIGS. 3A, 4A, 5A, 6A, and 7A show a perspective view of the arm (201) and gate (203) operation while FIGS. 3B, 4B, 5B, 6B, and 7B show the flow detector (100) in the same positions from a side cutaway view that better illustrates positioning of the vane assembly (111).

The testing arm (201), will serve to push against the proximal end (125) of the trip stem (112) so as to displace the paddle (113) downstream (although at the time of testing there is generally no fluid movement independent of that caused by the testing so "downstream" is based on the expected fluid movement that would result in the flow detector (100) activating). In the depicted embodiment, the testing arm (201) comprises a generally smooth-sided generally tear drop-shaped finger capable of rotating about an off-centered axis (241). Specifically, the arm (201) includes a back rotational section (211) which is generally rounded and a generally triangular section (213). The triangular section includes a smooth front edge (215) and a contrary back edge (217). The two edges (215) and (217) terminate at a point (219).

While this specific structure is not required in alternative embodiments and the arc can be triangular, spiral, or any other shape depending on embodiment, this structure provides for a very effective means of displacing the proximal end of the trip stem (112) to perform the first part of the testing as discussed below, while also getting the arm (201) out of the way to perform the second and third parts of the testing. Rotation of the arm (201) will generally be induced by a motor (207) or other mechanism to provide rotary motion about the axis (241) on command.

Figure 6B:
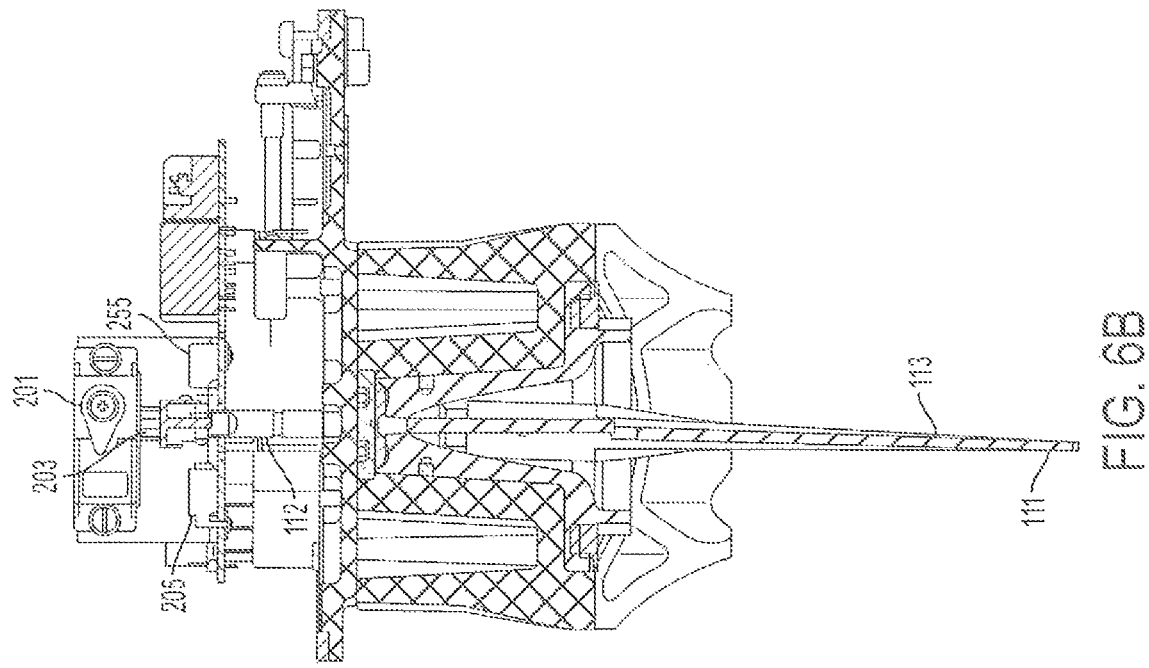
FIGS. 6A and 6B show a partial perspective and cut-away side view respectively of an embodiment of a flow detector after the testing arm releases the vane assembly and the vane has returned to its original or vertical state due to biasing of the vane assembly.
Figure 6A:
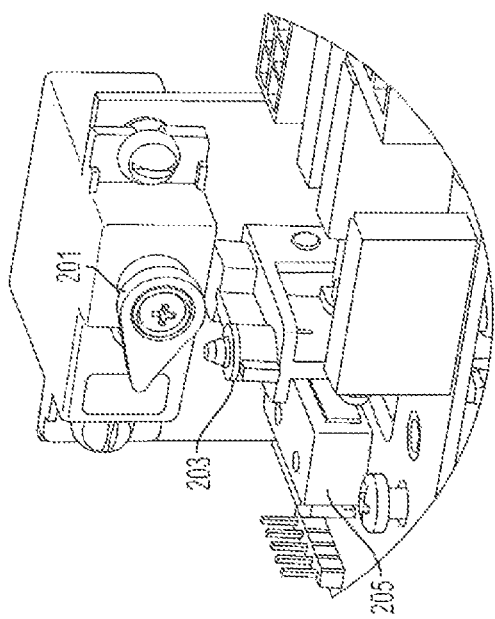

In the depicted embodiment, the arm (201) initially rotates in a clockwise direction (as viewed in the Figures) from the pre test point (position where testing is not occurring and when the flow detector (100) is in standard operation) shown in the various FIGS. 3A and 3B, to a completed point as shown in FIGS. 6A and 6B. The arm (201) then returns to the pre test position by rotating back to the position of FIGS. 3A and 3B through the arrangement of FIGS. 7A and 7B.

In operation, testing occurs as follows for the depicted embodiment. Upon initiation of the test, the arm (201) will move from the pre-test position of FIGS. 3A and 3B and rotate upstream (clockwise in the depiction) until it hits the one way gate (203) which is located at the proximal end (125) of the trip stem (112). Contact with the gate (203) is shown in FIGS. 4A and 4B. The gate (203) will be designed to swing about its axis (233) in the depicted embodiment with its free end (231) moving from left to right of FIGS. 3-7. Thus, when the arm (201) hits the gate (203) in FIGS. 4A and 4B moving in the clockwise direction it contacts an essentially rigid object which cannot rotate in that direction.

Figure 5B:
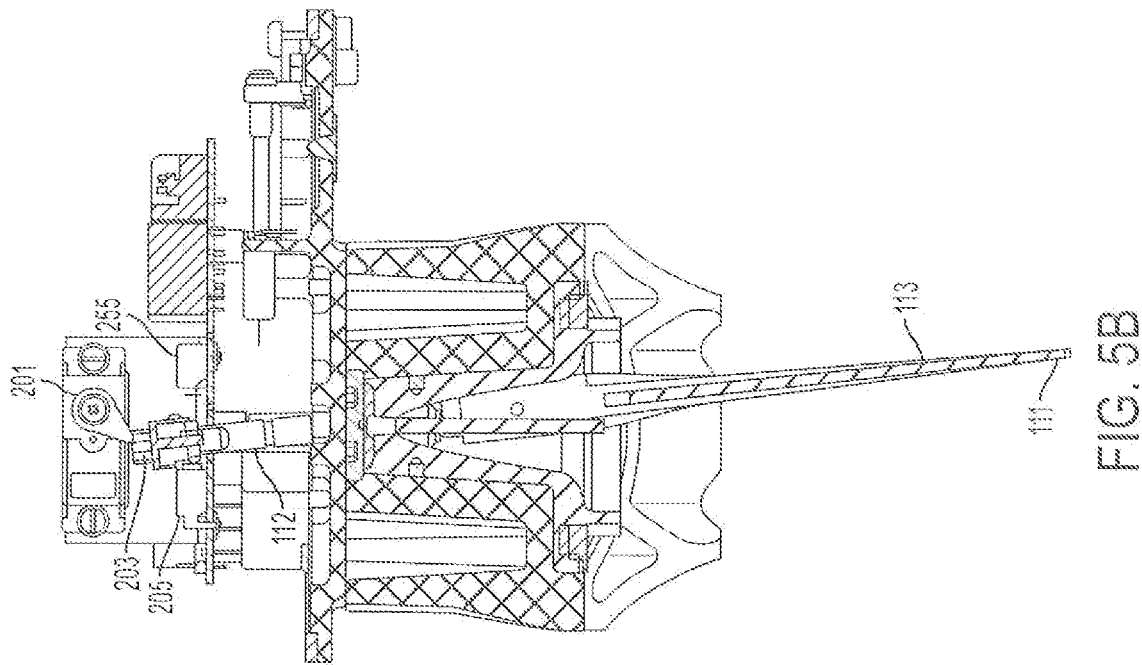
FIGS. 5A and 5B show a partial perspective and cut-away side view respectively of an embodiment of a flow detector as the testing arm displaces the trip stem and the alarm condition is triggered.
Figure 5A:
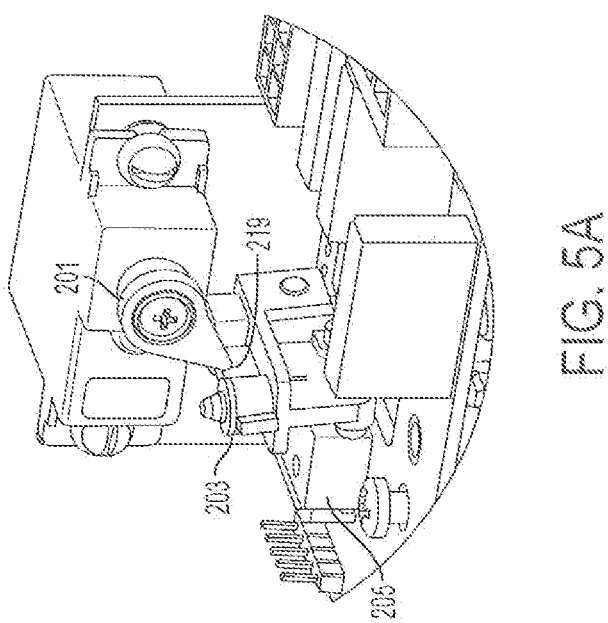

Since the gate (203), when contacted in this direction, is effectively rigidly attached to the trip stem (112) of the vane assembly (111), the proximal end (125) will be pushed away from the arm (201) as shown in FIGS. 5A and 5B. The gate will first contact the front edge (215) and then the point (219) resulting in the vane assembly (111) moving through the same arc it would if there was a detectable flow as can be seen in FIG. 5B. Upon the vane assembly (111) reaching its terminal location, the point (219) will generally be touching the upper periphery of the gate (203) (as shown in FIG. 5A) and the trip stem (112) will be positioned to close the switch (205) which activates the alarm if all components are working properly.

The arm (201) will generally not cease its rotational motion upon the switch (205), being tripped (successfully or not) but will continue to rotate clockwise (possibly after a brief hold) from FIGS. 5A and 5B which will allow the tip (219) of the arm (201) to completely clear the gate (203). When this happens, there is now no longer any force being applied to the gate (203) or the vane assembly (111) excepting the biasing force initially present. Thus, the vane assembly (111) will be biased back to its original vertical position. Due to the shape of the arm (201), the arm (201) is generally completely clear of the gate (203) as soon as the point (219) passes over the edge of the gate (203) and the return of the gate (203) passes below the back edge (217) which allows the vane assembly (111) to "snap" back to the vertical position under the force of the biasing.

Assuming the flow detector (100) is functioning correctly, the vane assembly (111) being allowed to return will disengage the switch (205) as soon as the tip (219) clears the gate (203) deactivating the alarm condition and indicating that the biasing mechanism is functioning. As should be clear, in the event a retard time delay was provided, the arm (201) can be sized or shaped to provide that the trip stem (112) contacts the switch (119) for sufficient time to trigger the alarm condition before being allowed to snap back. It should also be noted that in an alternative embodiment the amount of force to move the vane assembly (111) from the position of FIG. 4A to the position of FIG. 5A can also be measured to test if the correct amount of biasing force is present.

Figure 7A:
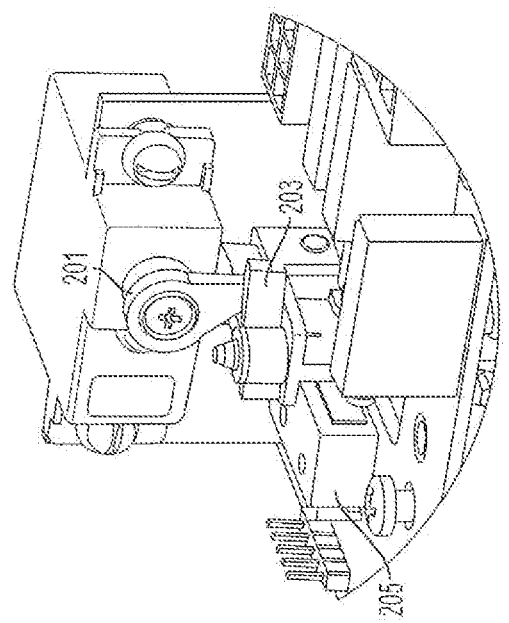
FIGS. 7A and 7B show a partial perspective and cut-away side view respectively of an embodiment of a flow detector as the arm is passing through the one-way gate moving the other direction after testing is completed.
Figure 7B:
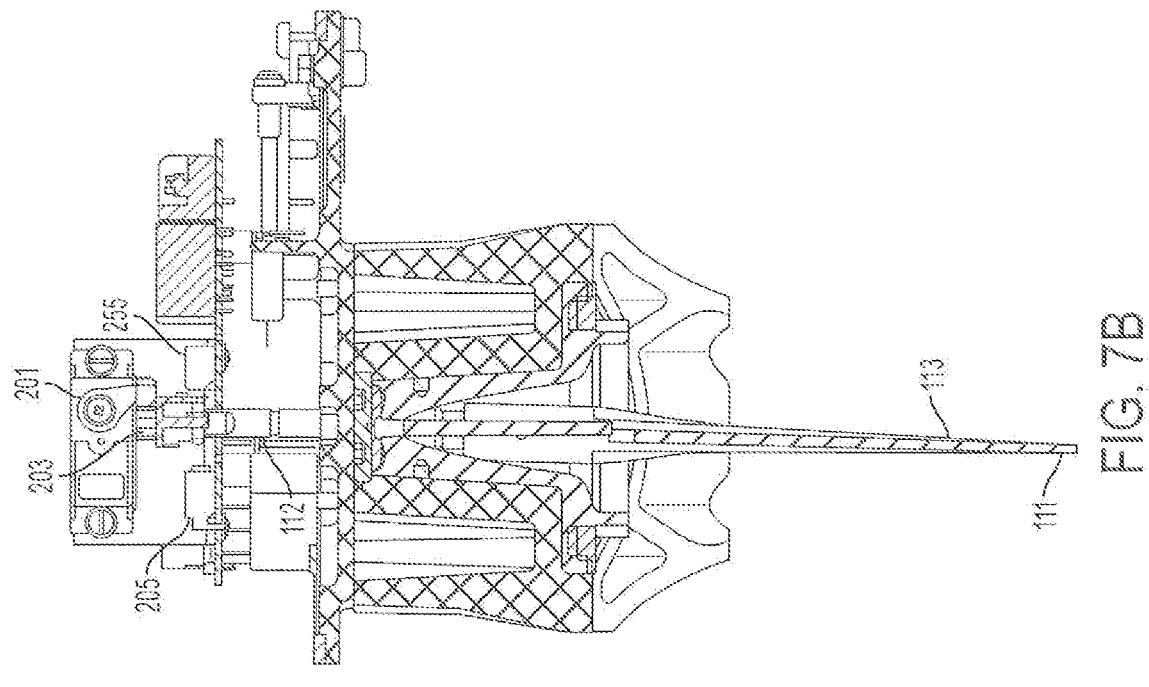

Once the test run is completed, the arm (201) will need to return to its pre-test position. In the depicted embodiment, the arm (201) in FIG. 6 will at this time reverse rotation (rotating counter-clockwise in the FIGS. 3-7) and will again contact the one way gate (203). However, when rotating in this direction, the gate (203) opens and is pushed out of the way by the arm (201) so that the vane assembly (111) does not move. The arm (201) passing back through the gate (203) is shown in FIGS. 7A and 7B. As the arm (201) continues to rotate counterclockwise it will again clear contact with the one way gate (203) from the tip (219) rising to sufficient height. The gate (203) will generally be biased to the closed position of FIGS. 3-6 and thus the auto-test system (101) will return to the arrangement of FIGS. 3A and 3B where it is again ready to be used.

As discussed above, in an alternative embodiment, the one way gate (203) can be eliminated (replaced with a rigid point of contact) as the arm (201) can rotate through the remaining portion of a full 360 degrees to clear from the position of FIG. 6 to arrive at the position of FIG. 3 instead of reversing its direction. However, while this is acceptable, it is generally a less preferred mechanism as it requires the housing (117) and (103), to have space to accommodate the arm (201) rotating through the upper vertical position (which extends it beyond its motor), which can be undesirable.

While the above description has provided for two tests to make sure the flow detector (100) is operating properly, one of ordinary skill would recognize that the tests above only test operation of the trip stem. They do not actually test operation of the other portion of the vane assembly (111). Specifically, movement of the trip stem (112) does not test if the paddle (113) interacts with a flow. That is, if the paddle (113) has broken or come loose from the vane assembly (111), the above testing would still indicate correct function so long as the trip stem's (112) proximal end (125) was still present.

In order to test that the paddle (113) is still present, is within the fluid, and would be expected to push the vane assembly (111) should a fluid flow commence, the flow detector (100) generally performs a third test in addition to the above two.

Specifically, the flow detector (100) includes a second sensor (in this embodiment switch (255)) which detects the vane assembly (111) when it is in the vertical position. Thus, the vane assembly (111) effectively has three positions. A first position (FIG. 3) where the vane assembly (111) has closed switch (255), a second intermediate position where the vane assembly (111) is moving through the arc and is between the two switches (255) and (205), and a third position (FIG. 5) where the vane assembly (111) is closing switch (205).

When the vane assembly (111) moves from the position shown in FIG. 5 to that of FIG. 6, the paddle (113) sweeps through the fluid in the pipe whose flow the flow detector is monitoring. Because the paddle (113) is designed to be pushed by the flow, this movement will result in the fluid being displaced by the moving paddle (113). This displacement will result in force being applied to the paddle (113) and can be used to detect that the paddle (113) is still present and is undamaged.

Specifically, the force applied to the paddle (113) due to the fluid being displaced will increase the amount of time it takes for the paddle (113) to return to the vertical. The time of displacement can be detected based on the time between when the switch (205) is opened (the vane assembly (111) leaves the flow position of FIG. 5) and when the switch (255) is closed (the vane assembly (111) returns to the ready position of FIG. 6) under the force from the biasing. If this time is greater than an expected window, where the time of "additional delay" is based upon the size of the paddle (113), the paddle (113) is presumed to be present and passing through fluid and the paddle's (113) presence and operation is verified. If the time to return is below this range, there is a potential error condition which can result in additional testing or an indication that the paddle (113) should be replaced.

It should be recognized that the specific amount of time that is used as a cutoff for when the paddle (113) is expected to be present vs. not present is dependent on a number of factors. Specifically, the type and amount of fluid present in the system, the size and shape of the paddle (113), and the biasing force of the biasing system. It will be understood by one of ordinary skill that the trip stem (112) will take some time to move between the two positions regardless of the presence or absence of the paddle (113) and a damaged paddle (113) may result in a time which is between the above two. Generally, therefore, the threshold time indication that a paddle (113) is present will be above the time it takes for trip stem (112) alone to return (the paddle (113) is totally missing). It may also or alternatively be set below a value for the paddle (113) to return on average when it is undamaged. In this way, a paddle (113) with sufficient damage to potentially present a failure circumstance can be detected, but a lesser damaged paddle (that will still work) will read as still present and acceptable.

Timing and determination of whether the paddle (113) is present will generally performed by a processor onboard the flow detector (100), but that is by no means required and it can be performed by external mechanics or electronics. In an alternative embodiment, the flow testing can determine if the paddle is present by detecting the amount of force required to move the vane through the arc from FIG. 4 to FIG. 5. In a still further embodiment, both tests can be performed together.

Figure 8:
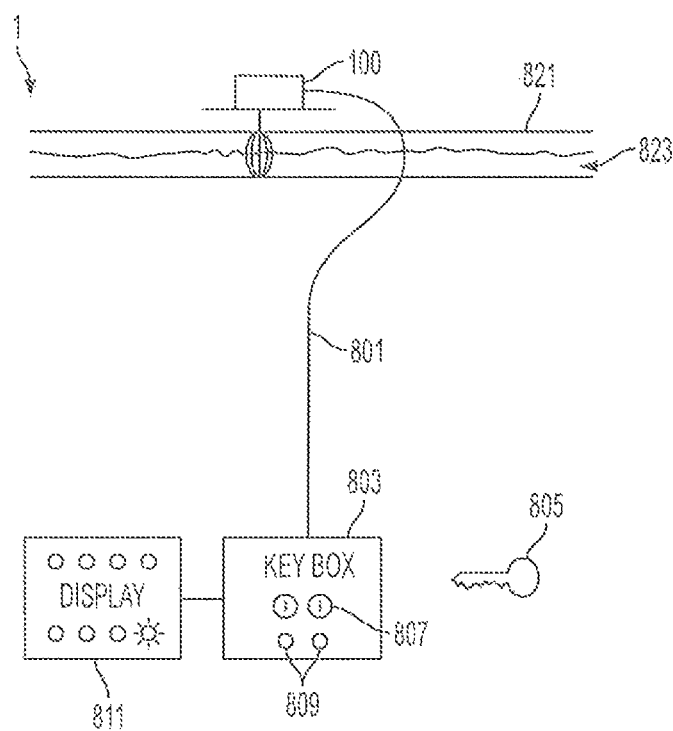
FIG. 8 is a block diagram showing the controller and display in conjunction with the flow detector in place in a fire sprinkler system.

The depicted self-test system (101) provides for testing as to the functionality of the flow detector (100) onboard the flow detector (100). That is, the self-test system (101) is preferably located "on-board" the flow detector (100). In this way, the self-test system (101) generally provides for testing in situ without need to alter or access components of the fire sprinkler system (1). As shown in FIG. 8, the self-test can be initiated remotely from the flow detector (100) which is in place in a pipe (821) filed with water (823) through the use of a wired or wireless connection (801). Remote control is generally preferred. A user can operate a controller (803) to initiate the test. This controller (803) can be of any type known to those of ordinary skill, but will generally be a "key box" or similar structure where a key (805) or other locking mechanism inhibits the testing from being run by those other than authorized personnel.

In an embodiment of a key box controller (803) operating the self-test system (101), a key (805) is inserted into a corresponding slit (807) and turned to either activate a series of buttons or switches (809) which are used to initiate the testing, or the turning of the key (805) activates the test itself. In an embodiment, the self-test system (101) can perform the entire test process in an automated fashion once initiated (that is, once commenced the testing is performed in its entirety without further human intervention) or the user can more directly initiate individual portions of the test upon specific command or indication.

In order to provide notification to the user of the result of the test, an indicator (811) (such as an LED light bank, a display, and/or an audible speaker) can provide feedback to the user of what occurred during the test. This output may be a simple pass or fail indication, or may provide for additional feedback such as by indicating specific passage or failure of different parts of the test, or can return specific test parameters (for example the specific time the vane assembly (111) took to return to the vertical position) for evaluation by the user. Such indicator (811) will preferably be co-located with the controller to provide for immediate feedback.

Regardless of the types of systems used to initiate the testing procedure, the testing procedure generally is performed in the manner discussed above so as to provide for the various types of test and determine the respective outcomes. The systems and method of the depicted embodiments, while effective for testing, can also provide for additional benefits during testing over alternative methods. Specifically, the self-test system (101) will generally "fail safe" in the event of a power outage or other interruption of the testing procedure (such as loss of signal from the controller).

Because of the inclusion of the one way gate (203), the arm (201) will generally be unable to stop in a position where it inhibits the vane assembly (111) from moving to an alarm condition in the event that the paddle (115) is moved by a flow within the pipe. Thus, should a flow commence while the self-test system (101) is in a disabled state, the flow detector (100) will generally still be operable. As can be seen in the various FIGS. 3-7, regardless of the resultant position at which the arm (201) was to fail and "stick," the vane assembly (111) will always be able to move to the alarm position and is not blocked by the arm (201). In the event that the arm (201) was to fail prior to the gate (as in FIG. 4), the vane assembly (111) can freely move without contacting the arm at all (201). Should the arm (201) fail in front of the gate (203) (e.g. as in the position of FIG. 7), the vane assembly (111) can still move as the gate (203) will move in the one way direction allowing the vane assembly (111) to move past the arm (201). If the arm (201) should fail during testing (e.g., between FIGS. 4 and 5) while the arm (201) may slightly alter the force required to move the paddle (113) sufficiently to trigger the switch (205) in some embodiments, an activation flow would generally still trigger the alarm. In this way, a failure at any time (except during the literal alarm switch test where it would fail with the alarm activated) will allow the flow detector (100) to still turn on if flow commenced.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A self-test system for a paddle-type flow detector, the system comprising:
   an arm, the arm being used to displace a trip stem from a first position to a second position wherein said trip stem is biased to said first position and said flow detector indicates flow when said trip stem is in said second position;
   a first sensor, the first sensor detecting when said trip stem is in said first position;
   a second sensor, the second sensor detecting when said trip stem is in said second position;
   wherein, when said trip stem is in said second position, said arm releases said trip stem and said trip stem returns to said first position because of said biasing;
   wherein, said self-test system determines the amount of time between when said first sensor stops detecting said trip stem and said second sensor detects said trip stem after said arm releases said trip stem; and
   wherein based on said amount of time, said self-test system determines if a paddle is attached to said trip stem.

2. The system of claim 1 wherein said arm rotates about an axis.

3. The system of claim 2 wherein said arm is sized and shaped to release said trip stem suddenly.

4. The system of claim 3 wherein said arm is generally teardrop-shaped.

5. The system of claim 2 wherein said arm rotates about said axis a first direction when said arm is displacing said trip stem and a second direction after it has released said trip stem.

6. The system of claim 5 further comprising a one-way gate, said one-way gate being attached to said trip stem such that said one-way gate is rigid when said arm moving in said first direction contacts said one-way gate, but opens when said one-way gate is contacted by said arm moving in said second direction.

7. The system of claim 1 further comprising a one-way gate attached to said trip stem.

8. The system of claim 1
   wherein said first sensor and said second sensor each comprise switches;
   wherein said first switch is closed when said trip stem is in said first position; and
   wherein said second switch is closed when said trip stem is in said second position.

9. A paddle-type flow detector including an auto-test system, the detector comprising:
   a housing;
   a vane assembly extending from said housing;
   a biasing mechanism biasing said vane assembly to a first position;
   a first sensor which detects when said vane assembly is in said first position;
   a second sensor which detects when said vane assembly is in a second position;
   an arm within said housing, said arm displacing said vane assembly from a first position to a second position when an auto-test is initiated;
   wherein, when said vane assembly is in said second position, said arm releases said vane assembly and said vane assembly returns to said first position because of said biasing;
   wherein, said detector determines the amount of time between when said first sensor stops detecting said vane assembly and said second sensor detects said vane assembly after said arm releases said vane assembly; and
   wherein based on said amount of time, said detector determines if said vane assembly comprises a paddle.

10. The detector of claim 9 wherein said paddle-type flow detector is position in a fire sprinkler system.

11. The detector of claim 10 wherein said fire sprinkler system is a wet pipe system.

12. The detector of claim 9 wherein said arm rotates about an axis.

13. The detector of claim 12 wherein said arm is sized and shaped to release said vane assembly suddenly.

14. The detector of claim 12 wherein said arm rotates about said axis a first direction when said arm is displacing said vane assembly and a second direction after it has released said vane.

15. The detector of claim 14 further comprising a one-way gate, said one-way gate being attached to said vane assembly such that said one-way gate is rigid when said arm moving in said first direction contacts said one-way gate, but opens when said one-way gate is contacted by said arm moving in said second direction.

16. The detector of claim 9 wherein said vane assembly includes a trip stem.

17. The detector of claim 16 further comprising a one-way gate attached to said trip stem.

18. The detector of claim 9 further comprising a key box, said key box allowing a user to initiate the self-test.

19. The detector of claim 18 wherein said key box further includes an indicator indicating the result of said self-test.

20. The detector of claim 9
   wherein said first sensor and said second sensor each comprise switches;
   wherein said first switch is closed when said vane assembly is in said first position; and
   wherein said second switch is closed when said vane assembly is in said second position.

* * * * *